United States Patent Office 3,709,916
Patented Jan. 9, 1973

3,709,916
ANTHRAQUINONE DYESTUFFS
Rutger Neeff, Leverkusen, and Erich Klauke, Odenthal-Hahnenberg, Germany, assignors to Farbenfabriken Bayer Aktiengesellschaft, Leverkusen, Germany
No Drawing. Filed Mar. 13, 1970, Ser. No. 19,461
Claims priority, application Germany, Mar. 19, 1969, P 19 13 840.0
Int. Cl. C09b 1/50
U.S. Cl. 260—380                           1 Claim

ABSTRACT OF THE DISCLOSURE

Dyestuff of the formula

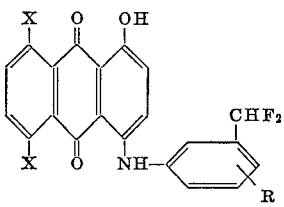

in which one X denotes a hydroxy group, the other X is an amino or nitro group, and R stands for a hydrogen atom or a chlorine atom, as well as a process for the production of these dyestuffs characterised in that 4,8-dinitro-1,5-dihydroxy-anthraquinone and/or 4,5-dinitro-1,8-dihydroxy-anthraquinone is heated with anilines of the formula

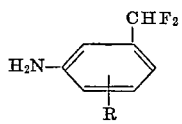

(R=H, Cl)

optionally in the presence of inert organic diluents, at temperatures of about 100–220° C., and the nitro group containing resultant dyestuffs are optionally reduced in known manner.

---

The subject-matter of the present invention comprises dyestuffs of the formula

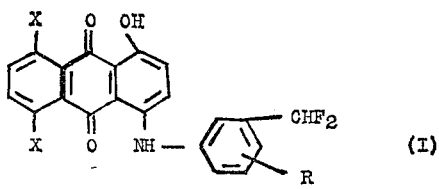

in which one X denotes a hydroxy group, the other X is an amino or nitro group, and R stands for a hydrogen atom or a chlorine atom.

The subject-matter of the invention also comprises a process for the production of the dyestuffs (I), characterised in that 4,8-dinnitro-1,5-dihydroxy- and/or 4,5-dinitro-1,8-dihydroxy-anthraquinone is heated with anilines of the formula

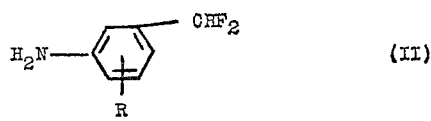

in which R stands for a hydrogen atom or a chlorine atom, for example, with 3-difluoromethyl-aniline,, 3-difluoromethyl-4-chloro-, 5-chloro- or -6-chloro-aniline, at temperatures of about 100–220° C., optionally in the presence of inert diluents, and the resultant dyestuffs of the formula

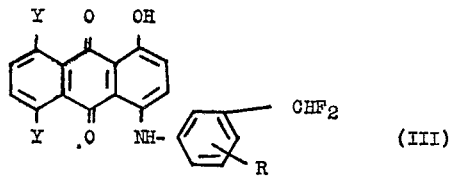

in which one Y denotes a hydroxy group, the other Y is a nitro group, and R means hydrogen or a chlorine atoms, are reduced in known manner, if desired.

The reaction of the dinitro-dihydroxy-anthraquinones with the optionally chloro-substituted 3-difluoromethyl-anilines can be carried out in the base itself, but the condensation is preferably performed in organic inert diluents, such as e.g. in hydrocarbons such as toluene, xylene, o-dichlorobenzene, trichlorobenzene, nitrobenzene; alcohols such as amyl alcohol; ether alcohols, such as 2-methoxy-ethanol, 2-ethoxy-ethanol, 2-butoxy-ethanol, diethylene glycol monomethyl or -ethyl ether; ethers such as n-dibutyl ether; esters such as acetic acid amyl esters; ether esters such as glycol monomethyl ether acetate; sulphoxide such as dimethyl sulphoxide; or sulphones such as sulpholane.

The reduction of the dyestuffs of the Formula III obtained by the reaction of the dinitro-dihydroxy-anthraquinones with the optionally chloro-substituted 3-difluoromethyl-anilines, to form dyestuffs of the Formula IV

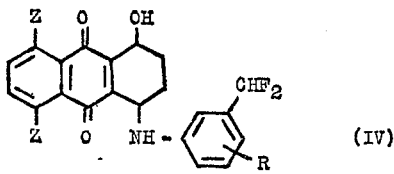

in which one Z denotes a hydroxy group, the other Z is an amino group and R denotes hydrogen or a chlorine atom, can be carried out in known manner, for example, by heating at 30–90° C. with sodium sulphide or sodium hydrogen sulphide in water or ethanol or with glucose in an alkaline-aqueous medium.

The new dyestuffs (I) are valuable products for the dyeing of plastic materials and synthetic materials and are preferably suitable for the dyeing of synthetic fibre materials. Suitable synthetic fibre materials are mainly linear aromatic polyesters, for example, polyethylene terephthalates or polyesters from 1,4-bis-(hydroxymethyl)-cyclohexane and terephthalic acid, or fibre materials of synthetic superpolyamides, polyurethanes, polyacrylonitrile, polyolefines, cellulose triacetate or cellulose 2½-acetate. The dyeing or printing can be carried out according to known processes. The dyestuffs are expediently used in a finely divided form. For dyeing polyethylene terephthalate fibres, the usual carriers may be added, or dyeing can be carried out at 120–145° C. under pressure. The dyestuffs are also eminently suitable for dyeing according to the thermosol process where the printed or padded fibre materials are briefly heated at temperatures of about 180–240° C., optionally after an intermediate drying. This heating is generally carried out for periods of time of 30 seconds to 2 minutes.

The dyestuffs are furthermore excellently suitable for the dyeing of mixed fabrics of polyester fibres and cellulose fibres such as cotton according to the aforesaid thermosol process; in this case, the padding liquor contains, besides the dyestuffs which can be prepared according to the invention, dyestuffs which are suitable for the dyeing of cotton, such as vat dyestuffs or, in particular, dyestuffs which are capable of forming a covalent bond with the cellulose fibres. Dyestuffs of this type are known as reactive dyestuffs and may contain, for example, a chlorotriazine or chloroquinoxaline radical. In such a case it is necessary to add acid-binding agents, such as alkali metal carbonates or phosphates to the padding liquor. When vat dyestuffs are used, treatment of the thermosolised fabric with an aqueous-alkaline solution of one of the reducing agents conventionally applied in vat dyeing is necessary.

The dyeings or prints obtained with the dyestuffs which can be prepared according to the invention are characterised by a very good affinity, very good texture and outstanding fastness to thermofixing, washing, ironing and light.

In British patent specification No. 1,142,136, dyestuffs are described which are obtained by the reaction of 4,8-dinitro-1,5-dihydroxy- or 4,5-dinitro-1,8-dihydroxyanthraquinones with 3-trifluoromethyl-aniline and subsequent reduction. Compared with the dyestuff which is described in Example 1 of the British patent specification and corresponds to the formula

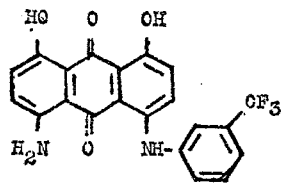

the dyestuff of Example 2 of the present application, which corresponds to the formula

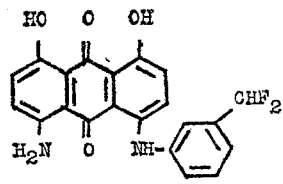

is characterised by better affinity, a clearer shade and an appreciably better fastness to light.

The parts in the following examples mean parts by weight, unless otherwise stated.

EXAMPLE 1

(a) 15 parts 4,5-dinitro-1,8-dihydroxy-anthraquinone and 14.5 parts 3-difluoromethyl-aniline are heated in 60 parts nitrobenzene at 170–175° C. until the dyestuff formation is chromatographically completed. The melt is mixed with 120 parts methanol, the precipitated 4-(3-difluoromethyl-anilino)-5-nitro-1,8 - dihydroxy - anthraquinone is filtered off with suction and washed with methanol. Isolation of the dyestuff can also be carried out by driving off the nitrobenzene with steam.

The dyestuff is also obtained with good yields when the nitrobenzene is replaced as the inert solvent with xylene, o-dichlorobenzene, trichlorobenzene, amyl alcohol, 2-methoxy-ethanol, 2-ethoxy- or 2-butoxy-ethanol, diethylene glycol monomethyl or -ethyl ether, n-dibutyl ether, acetic acid amyl ester, glycol monomethyl ether acetate, dimethyl sulphoxide or sulpholane.

(b) 100 parts of polyethylene terephthalate fibres are dyed with 1 part of the finely divided dyestuff mentioned in Example 1(a) in 4000 parts of water in the presence of 15 parts o-cresotic acid methyl ester as carrier at 100° C. and pH 4.5 for 1½ hours. The affinity is very good and there is obtained a clear blue dyeing which is characterised by very good texture and high fastness to washing, thermofixing, rubbing and light.

A similar dyeing is obtained when dyeing is carried out in the absence of a carrier at 125–130° C. for 2 hours.

(c) A fabric of polyethylene terephthalate fibers is impregnated on a foulard with a liquor containing, per litre, 15 g. of the dyestuff described in Example 1(a). The fabric is then squeezed to a weight increase of 70% and dried in a suspender nozzle dried or drying cabinet at 80–120° C. The fabric is subsequently treated on a stenter or in a nozzle hot flue with hot air at 190–220° C. for about 45 seconds, then rinsed, optionally subjected to a reductive after-treatment, washed, rinsed and dried. The reductive after-treatment for the purpose of removing any dyestuff particles which superficially adhere to the fibre can be carried out by introducing the fabric at 25° C. into a bath containing 3–5 cc./litre of a sodium hydroxide solution at 38° Bé. and 1–2 g./litre of concentrated sodium dithionite, heating the bath to 70° C. within about 15 minutes and keeping it at 70° C. for a further 10 minutes. The material is subsequently rinsed hot, acidified with 2–3 cc./litre of 85% formic acid at 50° C., rinsed and dried.

A deep blue dyeing is obtained which is characterised by a high dyeing yield, very good texture as well as by outstanding fastness properties, particularly very good fastness to thermofixing, washing, rubbing and light.

An analogous dyeing is obtained when the polyethylene terephthalate fibres are replaced with polyester fibres from 1,4-bis - (hydroxymethyl) - cyclohexane and terephthalic acid. In a similar way, a deep blue dyeing is obtained, when the polyethylene terephthalate fibres are replaced with cellulose triacetate fibres and thermosilisation is carried out at 215° C., or when polyamide or polyurethane fibres are used and thermosilication is carried out at 190–215° C.

(d) A precleaned and thermofixed fabric of polyethylene terephthalate fibres is printed with a printing paste consisting of 40 g. of the dyestuff mentioned in Example 1(a), 475 g. of water, 465 g. of crystal gum 1:2, and 20 g. of sulphonated castor oil. The crystal gum may be replaced with an alginate thickening agent. The printed and dried material is passed at 190–200° C. over a high capacity stenter or through a condensation apparatus in order to fix the dyestuff. The treatment lasts for about 30–60 seconds. The fixed print so obtained is subsequently rinsed cold, soaped with 1–2 g./litre of an anionactive detergent at 70–80° C. for about 10 minutes, rinsed first hot and then cold, and dried.

A print is obtained which corresponds to the dyeing of Example 1(b) and is characterised by the same outstanding fastness properties. A deep blue print is obtained in a similar way when the polyethylene terephthalate fibres are replaced with cellulose triacetate, polyamide or polyurethane fibres.

(e) When 100 parts of cellulose triacetate are dyed with 1 part of the finely divided dyestuff mentioned in Example 1(a) in 3000 parts of water at 100° C. for 1 hour, then a clear blue dyeing is obtained which is characterised by very good fastness to washing, thermofixing, rubbing and light; the affinity is very good.

(f) 10 parts of superpolyamide fibres are dyed at boiling temperature for 1 hour in a bath consisting of 400 parts of water, 0.2 part of a conventional dispersing agent and 0.2 part of the finely divided dyestuff mentioned in Example 1(a). A blue dyeing of very good fastness properties is obtained. Equally good results are achieved when the superpolyamide fibres are replaced with polyurethane fibres.

(g) 20 parts of cellulose 2½ acetate fibres are dyed in a bath consisting of 600 parts of water, 1 part of Marseilles soap, and 0.2 part of the finely divided dyestuff mentioned in Example 1(a) at 75° C. for 1 hour. A blue dyeing of good fastness to washing and light is obtained.

EXAMPLE 2

12 parts of the dyestuff described in Example 1(a) are heated in 200 parts of a 5% sodium sulphide solution at 90–95° C. for one hour. The dyestuff formed is filtered off with suction after cooling, washed with a dilute ammonium chloride solution and water, and there is obtained 4 - (3 - difluoromethyl-anilino)-5-amino-1,8-dihydroxy-anthraquinone; when applied to polyethylene terephthalate fibres according to Example 1(b) or 1(c), it has very good affinity and yields clear blue shades of very good fastness to washing, thermofixing, rubbing and light.

EXAMPLE 3

15 parts 4,8-dinitro-1,5-dihydroxy-anthraquinone are heated with 14.5 parts 3-difluoromethyl-aniline in 60 parts nitrobenzene at 170–175° C. until no more starting material can be detected by chromatography. The dyestuff is isolated by the addition of 120 parts methanol or by driving off the nitrobenzene with steam, and there is obtained 4-(3-difluoromethyl-anilino) - 8-nitro - 1,5-dihydroxy-anthraquinone; when applied to polyethylene terephthalate fibres according to Example 1(b) or 1(c), it has very good affinity and yields deep blue dyeings of excellent fastness to washing, thermofixing, rubbing and light. If the dyestuff obtained is reduced according to Example 2, then there is obtained 4-(3-difluoromethyl-anilino)-8-amino-1,5 - dihydroxy-anthraquinone which dyes polyethylene terephthalate fibres according to Example 1(b) or 1(c) in clear blue shades of very good fastness properties.

EXAMPLE 4

15 parts 4,5-dinitro-1,8-dihydroxy-anthraquinone and 20 parts difluoromethyl-4-chloro-anilino are heated in 60 parts nitrobenzene at 170–175° C. until no more starting material can be detected by chromatography. After cooling, the product is precipitated in the form of crystals of grey-violet appearance; it is filtered off with suction, washed with methanol, and there is obtained 4-(3-difluoromethyl-4-chloro-anilino) - 5-nitro-1,8-dihydroxy-anthraquinone; when applied to polyethylene terephthalate fibres according to Example 1(b) or 1(c), this yields clear blue shades of very good fastness to washing, thermofixing, rubbing and light. If the 3-difluoromethyl-4-chloro-aniline mentioned in the present example is replaced with 3-difluoromethyl-5-chloro- or -6-chloroaniline, then analogous procedure yields 4-(3-difluoromethyl-5-chloro- or -6-chloro-anilino)-5-nitro-1,8-dihydroxy-anthraquinone which dyes polyetheneterephthalate fibres in blue shades. If the dyestuffs mentioned in the present example are reduced according to Example 2, then there are obtained the 4-(3-difluoromethyl-4-chloro-, -5-chloro- or -6-chloro-anilino)-5-amino-1,8-dihydroxy-anthraquinones which dye polyethylene terephthalate fibres according to Example 1(b) or 1(c) in blue shades of very good fastness properties.

EXAMPLE 5

15 parts 4,8-dinitro-1,5-dihydroxy-anthraquinone and 20 parts 3-difluoromethyl-4-chloro-aniline are heated in 60 parts nitrobenzene at 170–175° C. until no more starting material can be detected by chromatography. After cooling, the product is precipitated in the form of crystals of brown appearance; it is filtered off with suction, washed with methanol, and there is obtained 4-(3-difluoromethyl-4 - chloro-anilino)-8-nitro - 1,5-dihydroxy-anthraquinone; when applied to polyethylene terephthalate fibres according to Example 1(b) or 1(c), this yields clear blue shades of very good fastness to washing, thermofixing, rubbing and light. If the 3-difluoromethyl-4-chloro-aniline mentioned in the present example is replaced with 3-difluoromethyl-5-chloro- or -6-chloro-aniline, then the analogous procedure yields 4-(3-difluoromethyl-5-chloro- or -6-chloro-anilino)-8-nitro-1,5-dihydroxy-anthraquinone which dyes polyethylene terephthalate fibres in blue shades. If the dyestuffs obtained are reduced according to Example 2, then there are obtained the corresponding 4-(3-difluoromethyl-4-chloro-, -5-chloro- or -6-chloro-anilino)-8-amino-1,5-dihydroxy-anthraquinones which dye polyethylene terephthalate fibres according to Example 1(b) or 1(c) in blue shades of very good fastness properties.

EXAMPLE 6

7.5 parts 4,5-dinitro-1,8-dihydroxy-anthraquinone, 7.5 parts 4,8-dinitro-1,5-dihydroxy-anthraquinone and 16.5 parts 3-difluoromethyl-anilino are heated in 60 parts o-dichlorobenzene at 170–175° C. until no more starting material can be detected by chromatography. After driving off the o-dichlorobenzene with steam, there is obtained a mixture of 4-(3-difluoromethyl-anilino)-5-nitro-1,8-dihydroxy- and 4-(3-difluoromethyl-anilino)-8-nitro-1,5-dihydroxy-anthraquinone which dyes polyethylene terephthalate fibres according to Example 1(b) or 1(c) in deep blue shades of very good fastness properties; the affinity is very good.

We claim:
1. Dyestuffs of the formula

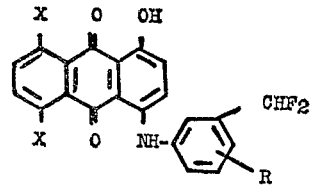

in which one X denotes a hydroxy group, the other X is an amino or nitro group, and R stands for a hydrogen atom or a chlorine atom.

References Cited

UNITED STATES PATENTS 2,466,008  5/1949  Dickey _____ 260—380

FOREIGN PATENTS 1,437,525  3/1966  France _____ 260—380

LORRAINE A. WEINBERGER, Primary Examiner

R. GERSTL, Assistant Examiner

U.S. Cl. X.R.

8—4, 39, 40